N. SCHREIBER.
BOILER SKIMMER.
APPLICATION FILED OCT. 17, 1914.
1,152,918.
Patented Sept. 7, 1915.
2 SHEETS—SHEET 2.
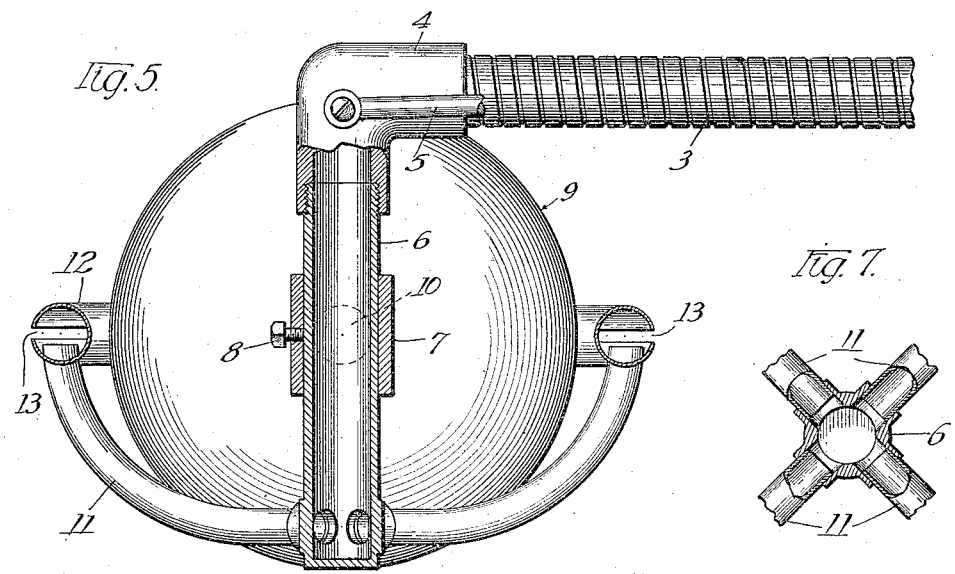
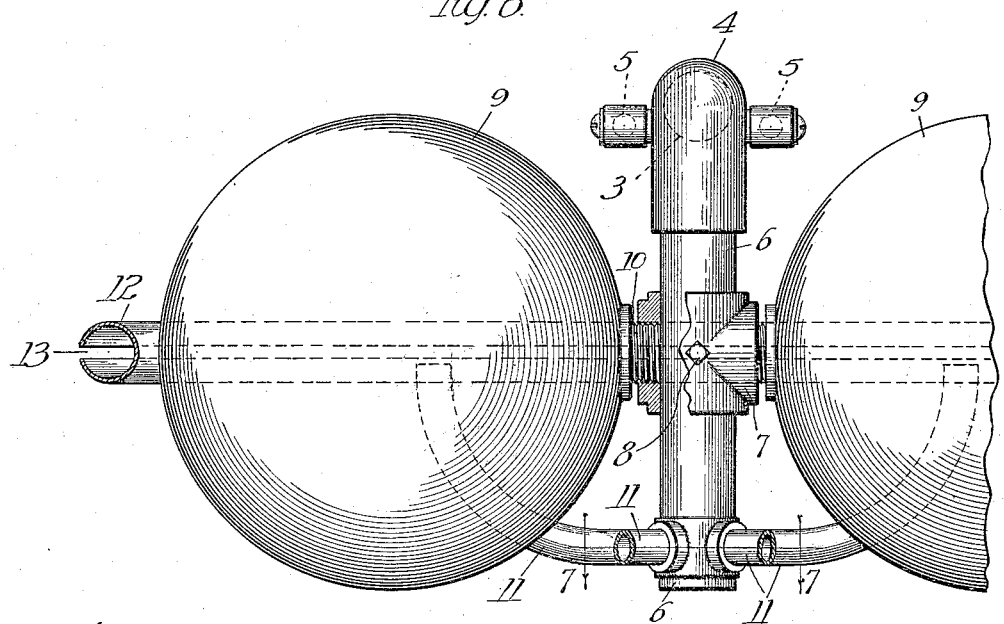
Witnesses:
Robert F. Wein
Arthur W. Carlson
Inventor:
Norbert Schreiber
A. Miller Belfield
Atty.

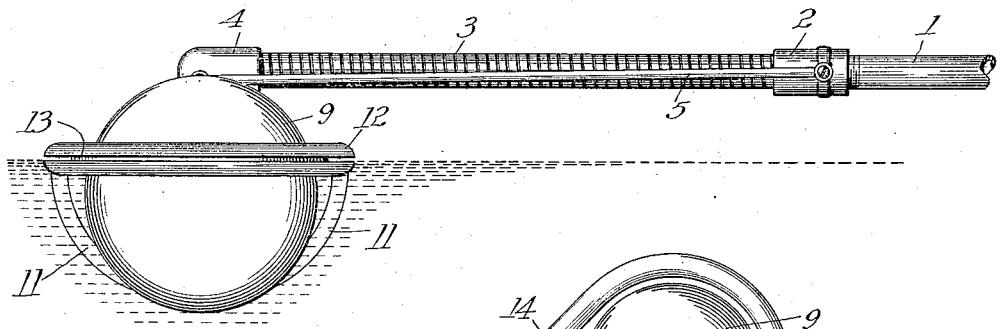
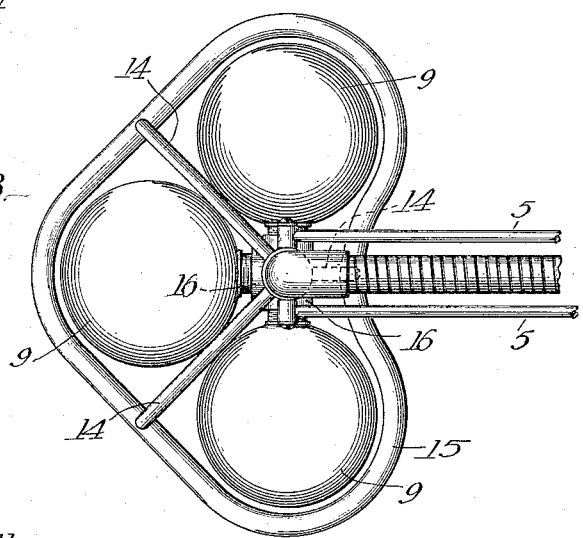
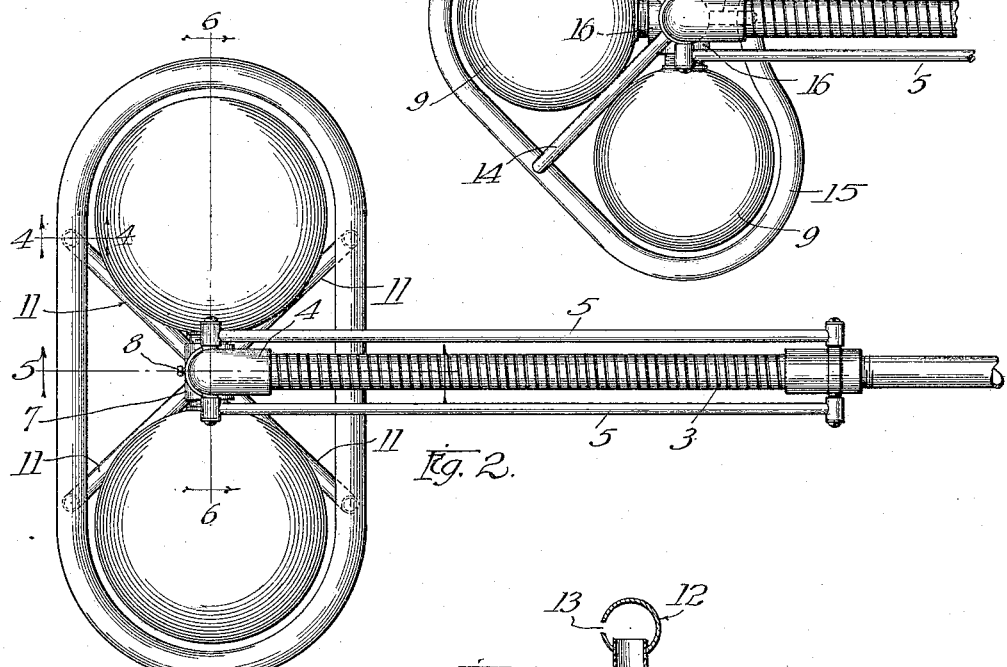
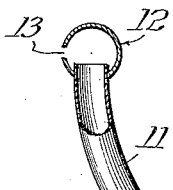

UNITED STATES PATENT OFFICE.

NORBERT SCHREIBER, OF LINCOLN, ILLINOIS, ASSIGNOR OF ONE-HALF TO RAPHAEL ROSENTHAL, OF LINCOLN, ILLINOIS.

BOILER-SKIMMER.

1,152,918.  Specification of Letters Patent.  Patented Sept. 7, 1915.

Application filed October 17, 1914. Serial No. 867,056.

*To all whom it may concern:*

Be it known that I, NORBERT SCHREIBER, a citizen of the United States, residing at Lincoln, in the county of Logan and State of Illinois, have invented a certain new and useful Improvement in Boiler-Skimmers, of which the following is a full, clear, concise, and exact description, reference being had to the accompanying drawings, forming a part of this specification.

My invention relates to improvements in boiler cleaners.

In my prior Patent 1,109,550, Sept. 1st, 1914, I have described and claimed a device of this character comprising a float having an intake associated therewith at the surface of the water and always maintained in horizontal position during the ordinary rise and fall of the water whereby the scum or other impurities on the surface of the water may be blown off from time to time, before the same are permitted to harden and form boiler scale.

The object of my present invention is to provide an improved device of this character wherein the intake is of considerable length and opens outwardly in all directions without obstruction so as to insure a complete skimming of the water, wherein a plurality of floats is provided requiring a less depth of water in which to float the apparatus, and wherein various structural improvements are provided, advantages of which will be apparent.

In the accompanying drawings, in which I have illustrated two embodiments of the invention, Figure 1 is a side elevation of one form of the device employing two floats. Fig. 2 is a top plan view thereof. Fig. 3 is a top plan view of a modified form of device employing three floats. Fig. 4 is a section on the line 4—4 of Fig. 2. Fig. 5 is a section on the line 5—5 of Fig. 2. Fig. 6 is a section on the line 6—6 of Fig. 2. Fig. 7 is a section on the line 7—7 of Fig. 6.

An outlet pipe 1 is located within the boiler and passes through a wall thereof on the exterior of which is located a suitable valve (not shown) which valve is opened when it is desired to skim off the impurities from the surface of the water. The pipe 1 has a coupling 2 at the end thereof secured also to a flexible tube 3 of any suitable construction, preferably in the form of an armored hose. A second coupling or elbow 4 is located at the other end of said hose, and is connected to said first coupling by a pair of rods 5—5, having pivotal connection with said respective couplings whereby one of them is free to move up and down with the change of level of the water in the boiler.

To the elbow 4 a depending pipe 6 is secured on which a collar 7 is slidingly mounted so that it may be adjusted vertically, (see Fig. 6) and fastened by means of a set screw 8. A plurality of floats 9 is secured to said collar by means of screw-threaded extensions 10 thereon. Said extension may also serve the purpose of set screws for the collar 7 and the set screw 8 be dispensed with. The floats are air tight and have no connection with the interior of the pipe 6. From near the bottom of said pipe, a plurality of branch pipes or arms 11 extend substantially radially and curve upwardly, on the upper ends of which branch pipes is supported an intake pipe 12 provided at its periphery with a continuous uninterrupted slot or intake 13 as shown in Fig. 4. The pipe 12 conforms in a general way to the outline of the floats; that is to say, where two floats are employed, said pipe is of oval form and surrounds both floats. The slot 13 is intended to be at the level of the water in the boiler irrespective of variations in the level of the water therein. The function of the floats is to maintain said slot or intake at said level. The vertical adjustment of the collar 7 on the pipe 6, permits the floats to be adjusted with respect to the piping or frame supported thereby as to maintain the slot at the desired level.

The flexible hose 3 permits sufficient up and down movement of the floats for the ordinary rise and fall of the water in the boiler, the level of which does not vary within wide limits. The rods 5 maintain the couplings 2 and 4 in definite spaced relation and add rigidity to the apparatus while not interfering with the up and down movement of the floats. The employment of a plurality of floats renders it possible to sustain a frame of a greater weight than if one float alone were used. Furthermore, greater buoyancy is obtained in proportion to the size of the apparatus, than where a single float is used. As a result, the apparatus does not need to be submerged to as great a depth to give the necessary sustaining force. Hence, if used over boiler tubes, the apparatus may be used where the tubes are covered by a less depth of water than would otherwise be required. The intake slot 13 passes entirely around the outer periphery of the pipe 12 and being unobstructed, the surface scum from all directions may be drawn in without danger of clogging.

In Fig. 3 I have shown a modified arrangement wherein three floats are employed instead of two. The branch pipes 14, which connect the inlet pipe 15 with its supporting pipe 6, converge at a point above the supporting collar 16 instead of below it as in the preceding form of device. The arrangement whereby the individual floats are secured to their support is the same as that heretofore described. The outlet pipe 15 is curved so as to closely surround the three floats, giving it a heart shaped outline.

From the two constructions described, it is obvious that a greater number of floats may be employed if required, by making only minor changes in the associated parts. Various other changes may be made in the structures described without departing from the spirit of the invention as expressed in the appended claims.

Having thus described my invention what I claim as new and desire to secure by Letters Patent of the United States is:

1. A boiler cleaner comprising an intake having a continuous uninterrupted opening facing in all directions in a horizontal plane, and a float for maintaining said intake at the surface of the water, during the ordinary rise and fall thereof.

2. A boiler cleaner comprising an intake consisting of a closed loop of piping having a continuous uninterrupted opening in a horizontal plane, and a float arranged within said loop and movable vertically with respect thereto, to adjust said opening to the level of the water.

3. A boiler cleaner comprising an intake consisting of a closed loop of piping having a continuous opening in a horizontal plane, a plurality of floats arranged within said loop and means connecting said loop to said floats to support the former at the level of the water, said means permitting vertical adjustment of said loop with respect to said floats.

4. A boiler cleaner comprising an intake at the surface of the water in the form of a closed loop having a continuous outer slot, a float within said loop for supporting said intake with its slot at the level of the water, and an armored hose connecting said intake with a suitable outlet thereby permitting the rise and fall of said float with the changing level of said water.

5. A boiler cleaner comprising a float maintaining an intake at the surface of the water, an outlet, a flexible connection between said intake and said outlet, and means for maintaining said intake and said outlet in spaced relation while permitting a pivotal movement of the former.

6. A boiler cleaner comprising three floats, an inlet pipe closely surrounding said floats and having a continuous outer slot therein, a vertical pipe about which said floats are grouped and a plurality of branch pipes connecting said inlet pipes to said vertical pipe.

7. In a boiler cleaner, the combination with an outlet pipe of a coupling thereon, an armored hose secured to said coupling, a second coupling at the other end of said armored hose, a pair of rods pivotally connected to said couplings to permit said hose to bend, a depending pipe secured to said second coupling, a plurality of branch pipes extending therefrom, an inlet pipe supported by said branch pipes and communicating therewith, said inlet pipe having a continuous slot therein, a collar on said depending pipe, and a plurality of floats detachably secured to said collar, said collar being adjustable vertically on said depending pipe to vary the relative height of said inlet pipe with respect to said float.

8. In a boiler cleaner, a plurality of floats arranged side by side and surrounded by a tubular member, having an uninterrupted surface intake adapted to receive scum from all angles.

In witness whereof, I hereunto subscribe my name this 8th day of October A. D., 1914.

NORBERT SCHREIBER.

Witnesses:
C. R. COLLIER,
J. W. CORWINE.

Copies of this patent may be obtained for five cents each, by addressing the "Commissioner of Patents, Washington, D. C."